United States Patent [19]

Copeland

[11] Patent Number: 5,014,892
[45] Date of Patent: May 14, 1991

[54] CAMERA BELT CLIP

[76] Inventor: Anthony S. Copeland, 28 Sunset Ct., #14, Venice, Calif. 90291

[21] Appl. No.: 405,723

[22] Filed: Sep. 11, 1989

[51] Int. Cl.⁵ .............................................. A45F 5/00
[52] U.S. Cl. .................................... 224/271; 224/908; 224/242; 224/253; 354/293
[58] Field of Search ............... 224/185, 224, 225, 242, 224/249, 252, 271, 908, 272, 253; 354/81, 82, 243; 294/139

[56] References Cited

U.S. PATENT DOCUMENTS

| | | | |
|---|---|---|---|
| D. 240,094 | 6/1976 | Linn | D2/400 |
| 252,448 | 1/1882 | Flatau | 224/271 |
| 267,714 | 11/1882 | Petmecky | 224/271 |
| 1,222,264 | 4/1917 | Cabanne | 224/271 |
| 2,130,262 | 9/1938 | Burlin | 294/139 |
| 2,603,134 | 7/1952 | Burnam | 224/185 |
| 3,209,968 | 10/1965 | Flanagan | 224/255 |
| 3,305,148 | 2/1967 | Zimmerman | 224/255 |
| 3,507,424 | 4/1970 | Burkins | 224/257 |
| 3,762,616 | 10/1973 | Brunstetter | 224/208 |
| 3,878,589 | 4/1975 | Schaefer | 224/272 |
| 3,910,470 | 10/1975 | Swenson et al. | 224/208 |
| 3,938,166 | 2/1976 | Sloop | 354/82 |
| 3,966,101 | 6/1976 | Taylor, III | 224/219 |
| 4,058,242 | 11/1977 | Brewer | 224/908 |
| 4,120,434 | 10/1978 | Hewes | 224/249 |
| 4,328,917 | 5/1982 | Reeberg | 224/254 |
| 4,437,753 | 3/1984 | Dunn | 354/293 |
| 4,676,420 | 6/1987 | Sharp | 224/271 |
| 4,714,184 | 12/1987 | Young et al. | 224/253 |

FOREIGN PATENT DOCUMENTS 2512970 3/1983 France.

Primary Examiner—Henry J. Recla
Assistant Examiner—Glenn T. Barrett
Attorney, Agent, or Firm—Harris, Kern, Wallen & Tinsley

[57] ABSTRACT

A camera carrying device having a support plate with a slot in the plate with the slot having a closed end and an open end joined by an intermediate section, with the intermediate section of lesser width than the closed end, an angle plate having first and second arms, with one of the arms disposed at an angle to the other, a first camera engaging stud carried in the first arm, and a second slot engaging stud carried in the second arm, with the second stud having an end section and an intermediate section, with the second stud end section larger than the slot, with the second stud intermediate section slideable along the slot intermediate section, and with the second stud intermediate section non-circular in cross-section.

5 Claims, 5 Drawing Sheets

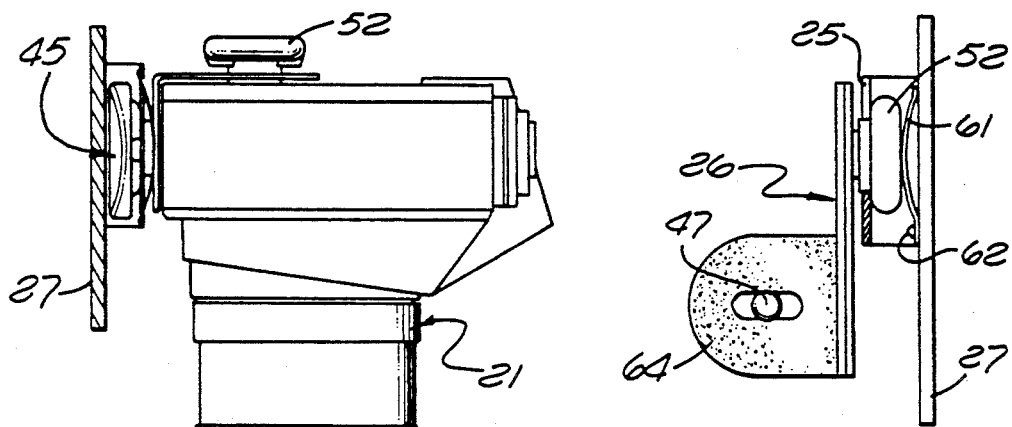
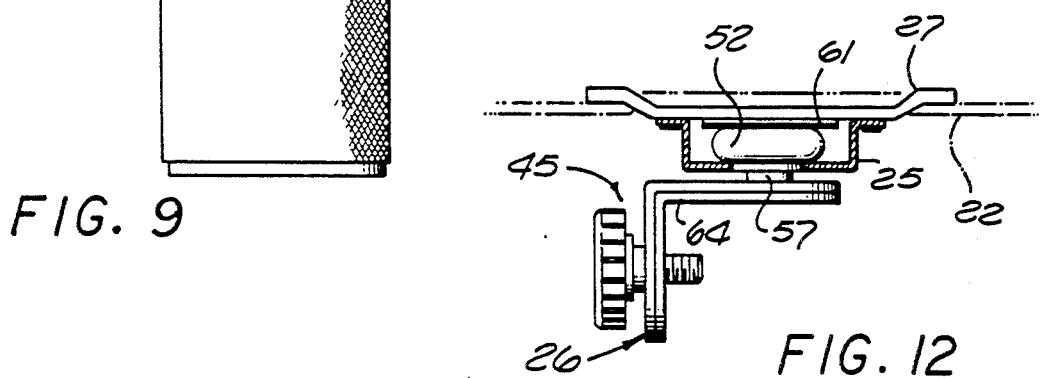
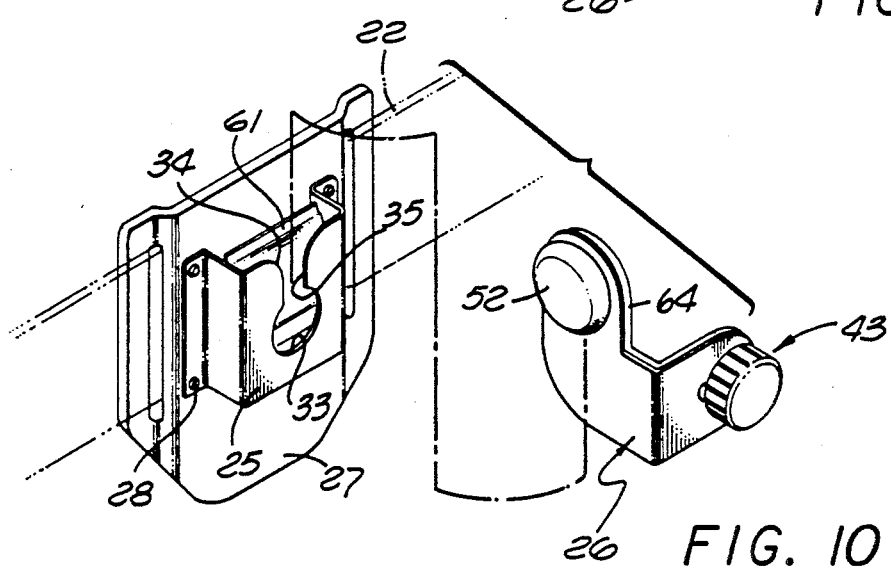

CAMERA BELT CLIP

BACKGROUND OF THE INVENTION

This invention relates to camera carrying devices, and in particular to a new and improved camera carrying device which permits the carrying of the camera without requiring grasping of the camera, and which permits quick and easy connecting and disconnecting of the camera to and from the support.

Cameras are carried in a variety of modes, including a case with a shoulder strap or belt, a neck strap or a hand strap for the camera, a handle directly attached to the camera, and a chest strap or chest harness.

These prior arrangements have a variety of disadvantages. Some of them are bulky, some require connecting and disconnecting of the straps and/or buckles, some require opening and closing of flaps, some are loosely arranged and permit the camera to swing relatively freely, some require continuous manual grasping of the camera.

It is an object of the present invention to provide a new and improved camera carrying device consisting essentially of two components, one attached to the camera and one attached to the wearer, typically to a conventional belt. A further object of the invention is to provide such a camera carrying device which will hold the camera firmly to the user's body, while at the same time permitting removal and installation by a simple single-handed motion.

Other objects, advantages, features and results will more fully appear in the course of the following description.

SUMMARY OF THE INVENTION

A camera carrying device having a support plate with a slot having a closed end and an open end joined by an intermediate section, with the intermediate section of lesser width than the closed end. An angle plate having first and second arms, with one of the arms disposed at an angle to the other. A first camera engaging stud carried in the first arm, and a second slot engaging stud carried in the second arm, with the second stud having an end section and an intermediate section, with the second stud end section larger than the slot, and with the second stud intermediate section slideable along the slot intermediate section.

In the preferred embodiment, the second stud intermediate section has inner and outer axial sections, with the inner axial section of a cross-section rotatable in the slot closed end, and with the outer axial section of a cross-section non-rotatable in the slot closed end, and includes a spring for urging the second stud end section toward the support plate, with the spring carried on the support plate for engaging the angle plate.

BRIEF DESCRIPTION OF THE DRAWINGS

FIG. 9 is a view similar to FIGS. 1 and 2 showing the use of the carrying device with a larger lens;

FIG. 10 is a view similar to that of FIG. 2 showing an alternative embodiment of the invention;

FIG. 11 is a side view, partly in section, of the embodiment of FIG. 10;

FIG. 12 is a top view of the embodiment of FIG. 10 showing the components engaged, with the camera removed;

DESCRIPTION OF THE PREFERRED EMBODIMENTS

Figure 1:
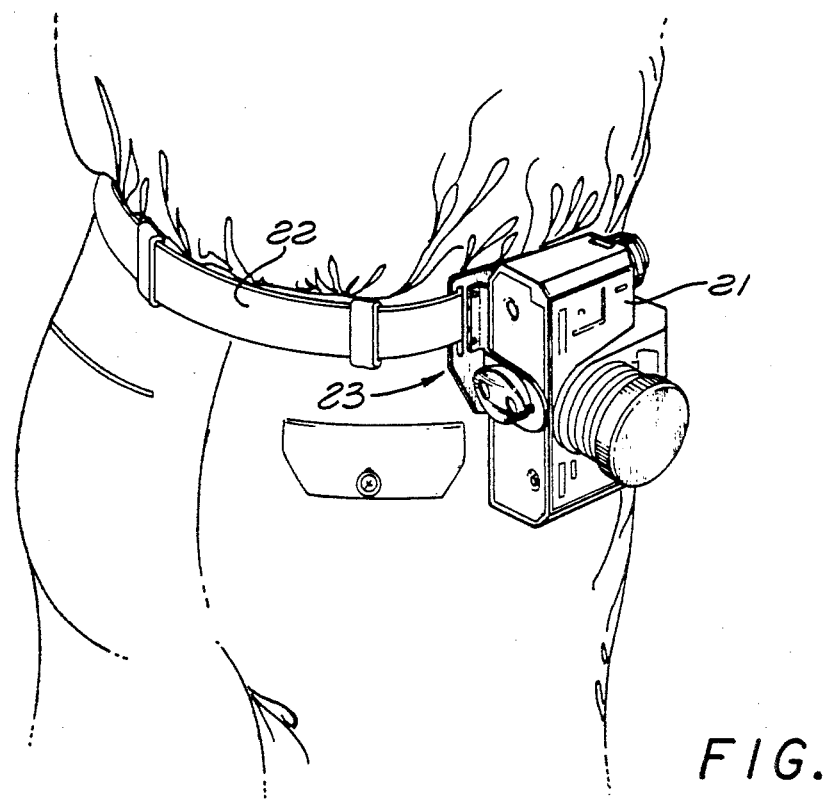
FIG. 1 is a partial side view illustrating a camera carried on a user's belt, and incorporating the presently preferred embodiment of the invention.

The presently preferred embodiment of the invention is shown in FIGS. 1-8. In FIG. 1 a camera 21 is shown attached to a belt 22 of a person by a camera carrying device 23, sometimes referred to as a camera belt clip.

The camera carrying device includes a support plate 25 and an angle plate 26, both typically made of sheet metal. In the embodiment illustrated, the support plate 25 is attached to a back plate 27 by rivets 28, with the back plate having slots 29 for sliding on the belt of the person.

Figure 2:
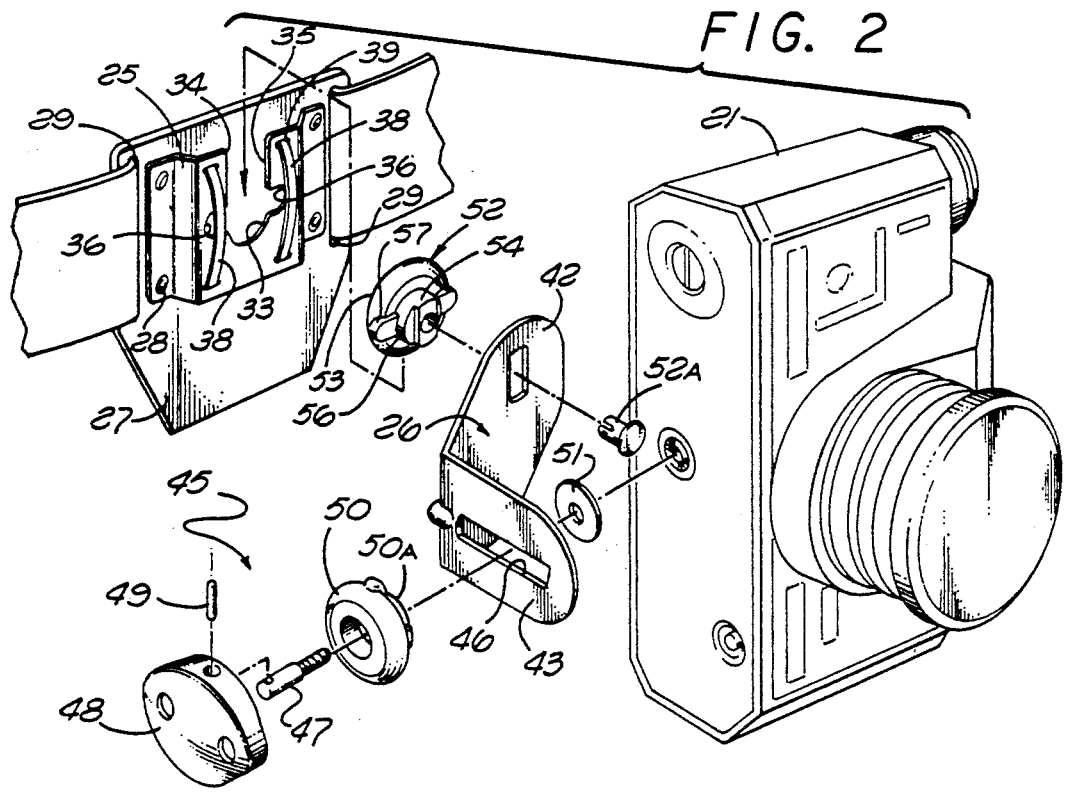
FIG. 2 is an exploded view of a portion of FIG. 1 illustrating the assembly of the components of the carrying device.
Figure 3:
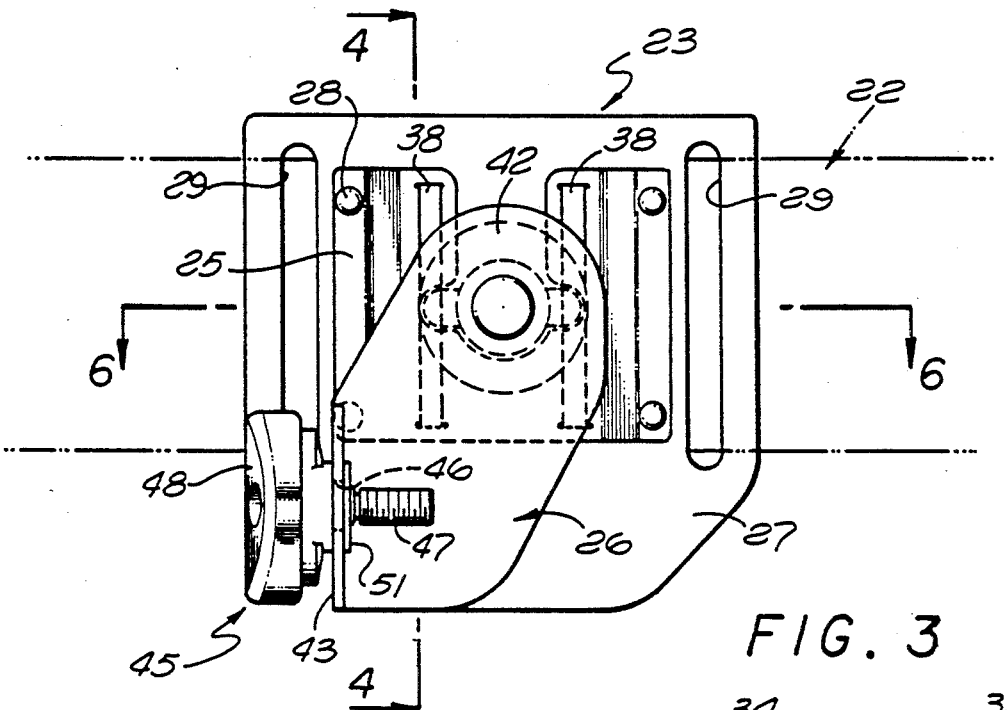
FIG. 3 is an enlarged partial view of the carrying device of FIG. 1, with the camera removed.

The support plate 25 has a central slot with a closed lower end 33, an open upper end 34, and an intermediate section 35 of the lesser width than the closed end 33. In the embodiment illustrated, as seen in FIGS. 2, 3 and 5, the slot has generally circular opposed projections 36 forming the lower end 33. Springs 38 are carried on the outer side of the support plate 25, typically in slots 39.

The angle plate 26 has an arm 42 and an arm 43 positioned at an angle to each other, preferably at 90°. A camera engaging stud 45 is carried in a slot 46 in the arm 43, and includes a threaded screw 47 fixed in a thumb wheel 48, typically by a pin 49. The threaded screw 47 is designed to engage the camera at the conventional tripod mount threaded opening, to clamp the camera to the angle plate. A sleeve 50 rotates on the pin 47 and has an inner portion 50A which rides in the slot 46 so that the sleeve does not rotate with the thumb wheel 48. A washer 51 may be a push on fit on the pin 47 to retain the stud 45 in place in the angle plate.

Figures 4A, 4B, 5A, 5B:
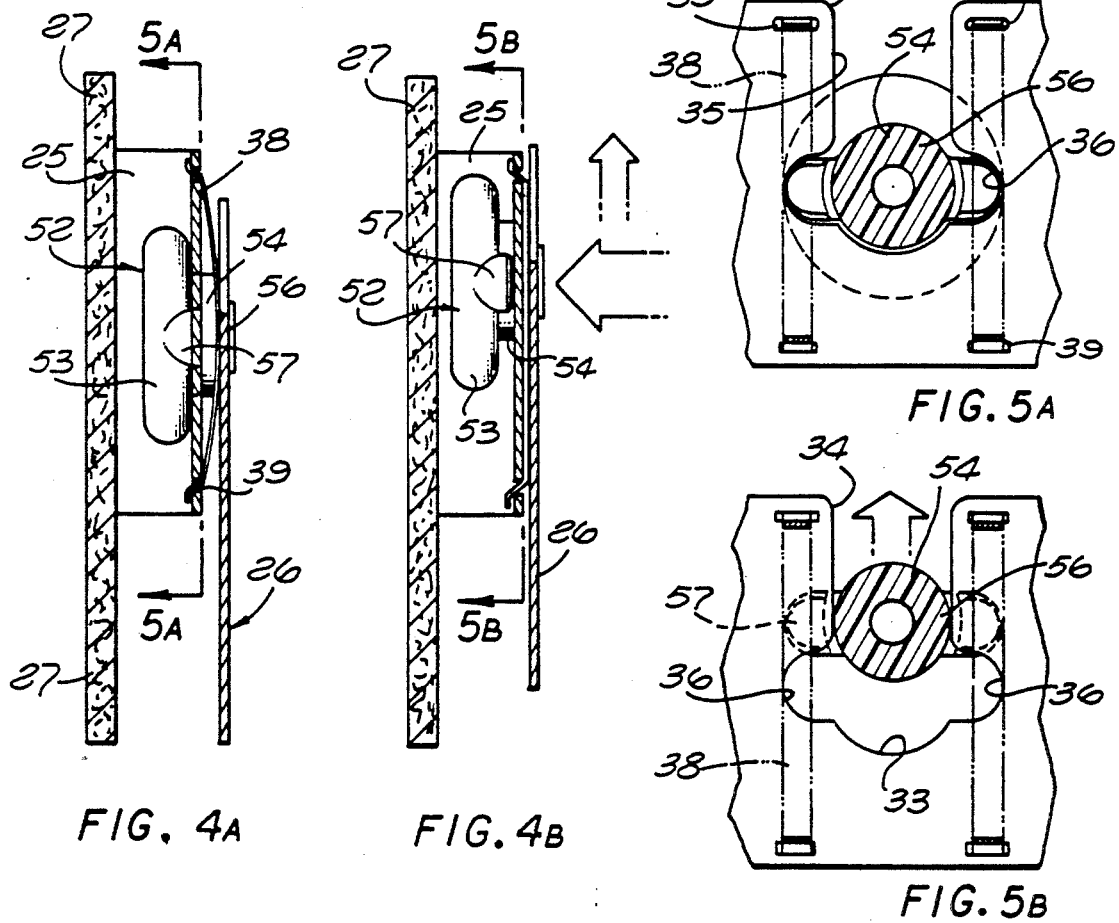
FIGS. 4A and 4B are enlarged partial section views taken along the line 4—4 of FIG. 3 illustrating the operation of the device.
FIGS. 5A and 5B are section views taken along the lines 5A—5A and 5B—5B, of FIGS. 4A and 4B, respectively.
Figure 6:
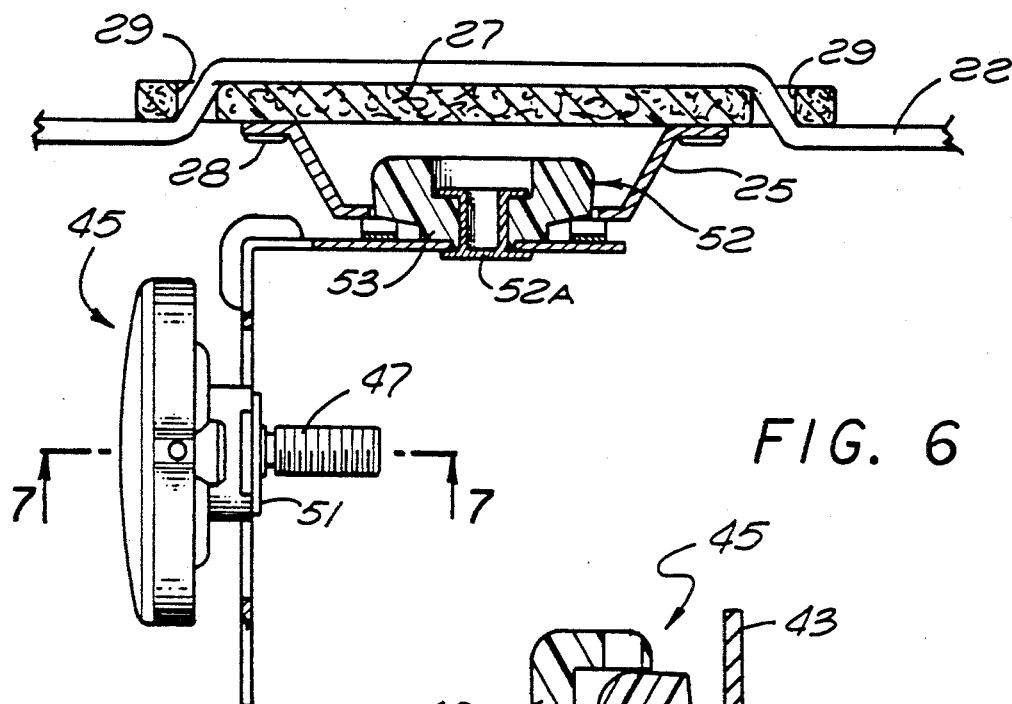
FIG. 6 is an enlarged section view taken along the line 6—6 of FIG. 3.
Figure 7:
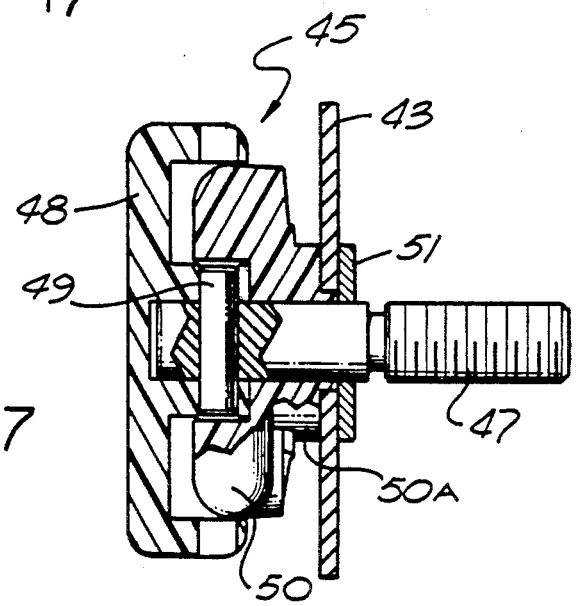
FIG. 7 is a section view taken along the line 7—7 of FIG. 6.
Figure 8:
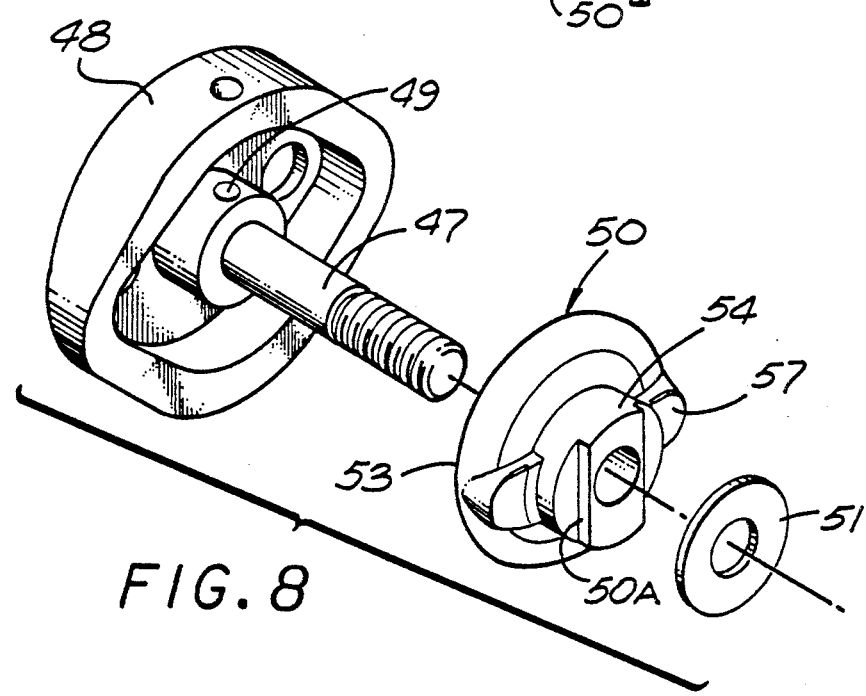
FIG. 8 is an exploded view showing the assembly of the stud of FIG. 7.
Figure 13:
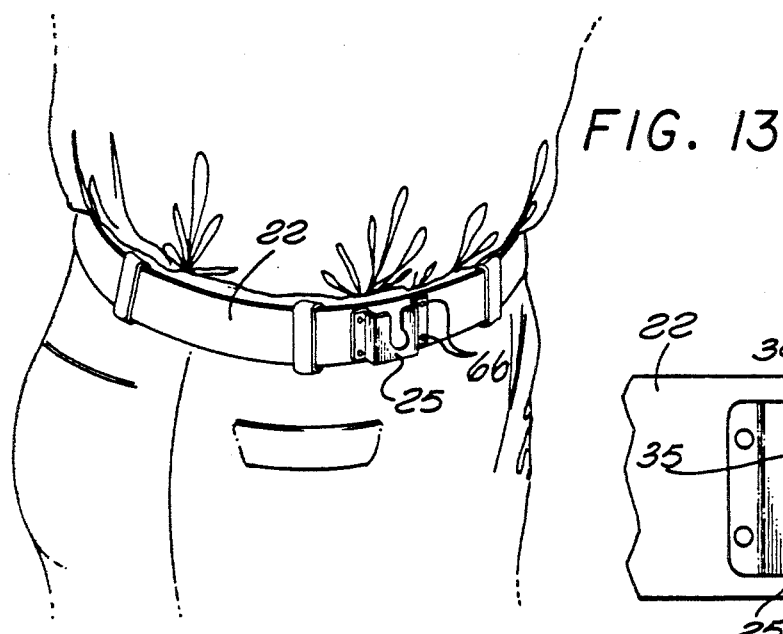
FIG. 13 is a view similar to that of FIG. 1, with the camera dismounted, showing another alternative embodiment of the invention.
Figure 14:
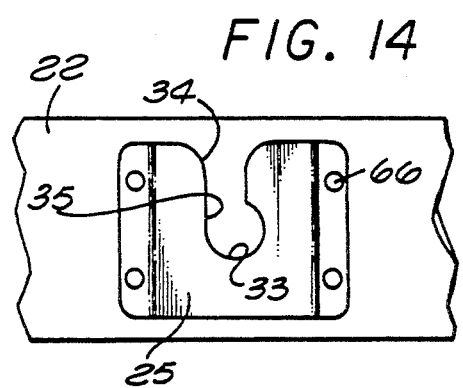
FIG. 14 is a view of the embodiment of FIG. 13 showing the mounting plate directly attached to a belt.
Figure 15:
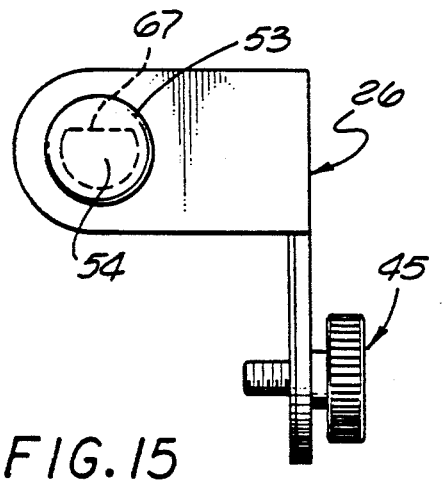
FIG. 15 is a side view of the angle plate of the embodiment of FIG. 13.
Figure 16:
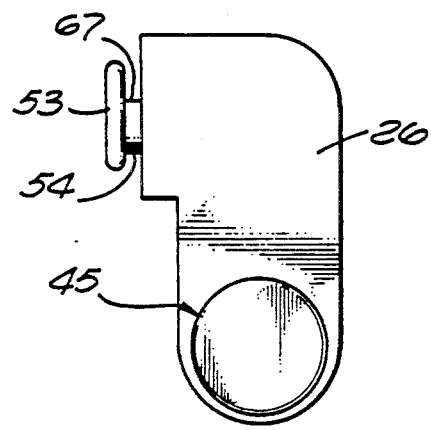
FIG. 16 is a rear view of the angle plate of FIG. 15.
Figure 17:
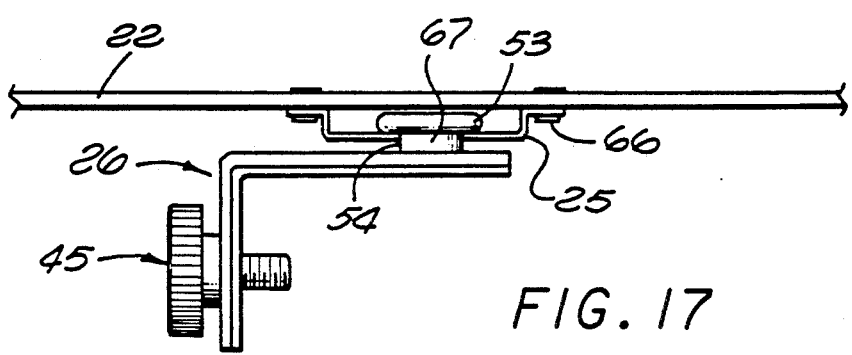
FIG. 17 is a top view of the embodiment of FIGS. 13 and 14, with the angle plate in position and with the camera removed.

A slot engaging stud 52 is fixed in the arm 42, typically by a rivet 52A. The stud 52 may be similar to the sleeve 50 of the stud 45, and has an outer end section 53 and an intermediate section 54, with the end section 53 being larger than the slot closed end 33 so that the stud cannot be pulled through the slot in a direction normal to the support plate, while the stud intermediate section 54 is of a size which permits the intermediate section to be slid along the intermediate section 35 of the slot, as shown in FIG. 5B. Further, the stud intermediate section 54 has an inner axial section 56 and an outer axial section 57. The inner axial section 56 is of a cross-section which is rotatable in the slot closed end 33, while the stud outer axial section 57 is of a cross-section that is not rotatable in the slot closed end. In the embodiment illustrated, the inner axial section 56 is circular and the outer axial section 57 is formed with opposed projecting bosses on the circular inner axial section. The outer axial section 57 of the stud 52 may correspond to the inner portion 50A of the sleeve 50 of the stud 45.

In operation, the support plate 25 is mounted on the belt, and the camera is mounted on the angle plate in the manner previously described. The camera is positioned with the slot engaging stud 52 above the slot in the support plate 25 and with the intermediate section 54 of the stud 52 directly above the open end 34. The camera is moved downward from the position shown in FIGS. 4B and 5B to the position shown in FIGS. 4A and 5A, with the arm 42 of the angle plate 26 engaging the springs 38, compressing these springs so that the angle plate can be moved toward the support plate and the inner axial section 56 of the slot engaging stud 52 can be moved downward through the intermediate section 35 of the slot in the support plate. The downward motion continues until the slot engaging stud is at the lower end 33, at which time the user may release the camera and the springs will bring the outer axial section 57 of the slot engaging stud 52 into the openings at 36. This engagement now locks the camera against vertical movement and rotational movement relative to the support plate.

When the user wishes to remove the camera, the camera is pushed inward toward the user's body, compressing the springs and permitting inward movement of the stud 52 to bring the outer axial section 57 of the stud out of engagement with the closed lower end 33, thereby permitting upward movement of the camera bringing the stud 52 out of the support plate from the position of FIGS. 4A and 5A to that of FIGS. 4B and 5B. When a long lens 21A is attached to the camera 21, the camera may be carried by the camera carrying device 23 in the manner shown in FIG. 9, with the sleeve 50 of the stud 45 positioned in the slot of the support plate 25.

An alternative embodiment of the invention is shown in FIGS. 10-12 wherein components corresponding to those of the embodiment of FIGS. 1-8 are identified by the same reference numerals. In this embodiment, a spring 61 is attached to the back plate 27 by rivets 62, with the end section 53 of the slot engaging stud 52 sliding between the spring 61 and the support plate 25.

The closed lower end 33 of the slot in the support plate is generally circular, as are the inner axial section 56 and the outer axial section 57 of the intermediate section 54 of the slot engaging stud 52. A thin layer of foam rubber or the like 64 may be attached to the camera engaging faces of the angle plate 26 for protection of the camera, if desired.

Another embodiment of the invention is shown in FIGS. 13-17, where elements corresponding to those of the previously disclosed embodiments are identified by the same reference numerals. In this embodiment, the support plate 25 is attached directly to the belt 22 by rivets 66.

The enclosed lower end 33 of the slot in the support plate is generally circular, but is offset laterally from the vertical axis of the intermediate section 35, thereby providing the lesser width for the intermediate section than for the closed end.

The slot engaging stud 52 has a circular end section 53, and an intermediate section which is circular except for a flat side 67.

With this configuration, the camera is initially positioned horizontal and then the stud 52 is moved downward through the slot in the support plate. On the stud reaching the bottom, the camera is turned 90° to the vertical position, and cannot be moved upward. In order to remove the camera, it must be rotated to the horizontal position and then raised, with the intermediate section 54 of the slot engaging stud 52 now slideable along the intermediate section 35 of the support plate slot.

I claim:
1. In a camera carrying device, the combination of:
a first support plate with slot means defining a slot in said first plate, with said slot having a closed end and an open end joined by an intermediate section, with said intermediate section of lesser width than said closed end;
a second support plate joined to said first support plate in spaced relation to form a housing;
spring means carried in said housing between said support plates, with said first support plate having a substantially flat surface facing said spring means;
an angle plate having first and second arms, with one of said arms disposed at an angle to the other;
a first camera engaging stud carried in said first arm; and
a second slot engaging stud carried in said second arm; with said second stud having an end section and an intermediate section, with said second stud end section larger than said slot, and with said second stud intermediate section slideable along said slot intermediate section, and
with said second stud end section having substantially flat parallel outer and inner faces for resting against said first support plate and said spring means for limiting rocking movement of said angle plate relative to said support plates.

2. A device as defined in claim 1 wherein said second stud intermediate section has inner and outer axial sections, with said inner axial section of a cross-section slideable along said slot intermediate section, and with said outer axial section of a cross-section non-slideable along said slot intermediate section.

3. A device as defined in claim 1 wherein said second stud has an end section and an intermediate section, with said second stud end section larger than said slot, and with said second stud intermediate section slideable along said slot intermediate section.

4. A device as defined in claim 3 wherein said second stud intermediate section has inner and outer axial sections, with said inner axial section of a cross-section slideable along said slot intermediate section, and with said outer axial section of a cross-section non-slideable along said slot intermediate section.

5. In a camera carrying device, the combination of:
a first support plate with slot means defining a slot in said plate, with said slot having a closed end and an open end joined by an intermediate section, with said intermediate section of lesser width than said closed end;

a second support plate joined to said first support plate in spaced relation to form a housing;

spring means carried in said housing between said support plates, with said first support plate having a substantially flat surface facing said spring means;

a mounting plate having first and second arms spaced from each other;

first camera engaging means carried in said first arm; and second slot engaging means carried in said second arm, with said second means having an end section and an intermediate section, with said second means end section larger than said slot, and with said second means intermediate section slideable along said slot intermediate section, and with said second stud end section have substantially flat parallel outer and inner faces for resting against said first support plate and said spring means for limiting rocking movement of said angle plate relative to said support plates.

* * * * *